(12) United States Patent
Hutton et al.

(10) Patent No.: US 9,983,990 B1
(45) Date of Patent: May 29, 2018

(54) CONFIGURABLE STORAGE CIRCUITS WITH EMBEDDED PROCESSING AND CONTROL CIRCUITRY

(71) Applicant: Altera Corporation, San Jose, CA (US)

(72) Inventors: Michael D. Hutton, Mountain View, CA (US); Richard Grenier, San Jose, CA (US)

(73) Assignee: Altera Corporation, San Jose, CA (US)

( * ) Notice: Subject to any disclaimer, the term of this patent is extended or adjusted under 35 U.S.C. 154(b) by 491 days.

(21) Appl. No.: 14/086,853

(22) Filed: Nov. 21, 2013

(51) Int. Cl.
*G06F 3/00* (2006.01)
*G06F 13/00* (2006.01)
*G06F 15/00* (2006.01)
*G06F 12/00* (2006.01)

(52) U.S. Cl.
CPC .................................. *G06F 12/00* (2013.01)

(58) Field of Classification Search
CPC ..................................................... G06F 12/00
USPC ........ 710/1, 3, 5, 107, 110, 307; 712/23, 43, 712/204, 206; 708/620; 365/49.1
See application file for complete search history.

(56) References Cited

U.S. PATENT DOCUMENTS

| | | | | |
|---|---|---|---|---|
| 4,418,383 A * | 11/1983 | Doyle et al. | | 710/307 |
| 5,426,769 A * | 6/1995 | Pawloski | | G06F 9/30145 710/2 |
| 5,440,749 A * | 8/1995 | Moore et al. | | 712/206 |
| 5,522,084 A * | 5/1996 | Ando | | 712/23 |
| 5,535,405 A * | 7/1996 | Byers et al. | | 710/110 |
| 5,574,927 A * | 11/1996 | Scantlin | | G06F 9/30036 703/23 |
| 5,615,383 A * | 3/1997 | Caudel et al. | | 712/43 |
| 5,655,097 A * | 8/1997 | Witt et al. | | 712/204 |

(Continued)

OTHER PUBLICATIONS

LaForest et al. "Efficient Multi-Ported Memories for FPGAs," Department of Electrical and Computer Engineering, University of Toronto, Feb. 2010 (10 pages) [Retrieved on Nov. 21, 2013]. Retrieved from the Internet<URL: http://www.eecg.toronto.edu/~steffan/papers/laforest_fpga10.pdf>.

(Continued)

*Primary Examiner* — Idriss N Alrobaye
*Assistant Examiner* — Henry W Yu
(74) *Attorney, Agent, or Firm* — Jason Tsai

(57) ABSTRACT

An integrated circuit may have configurable storage blocks. A configurable storage block may include a memory array, a processing circuit, and a configurable control circuit. The configurable storage block may receive an instruction which may be decoded in the control block to identify a command. The command may be associated with a pre-defined sequence of operations that the control block executes by directing the memory array to perform memory access operations and the processing circuit to execute data processing operations. These data processing operations may be executed on data retrieved during memory access operations, data received subsequent to receiving the instruction, or previously computed data. The processed data may be provided for further processing outside the configurable storage block or stored in the memory array. The configurable storage block may further have delay blocks to allow for delayed memory access to the memory array.

23 Claims, 9 Drawing Sheets

(56) References Cited

U.S. PATENT DOCUMENTS

| | | | | |
|---|---|---|---|---|
| 5,696,956 | A | * | 12/1997 | Razdan et al. .................. 712/23 |
| 5,850,452 | A | * | 12/1998 | Sourgen .................... G06F 7/76 |
| | | | | 380/28 |
| 6,020,759 | A | | 2/2000 | Heile |
| 6,144,573 | A | * | 11/2000 | Heile .......................... 365/49.1 |
| 6,237,074 | B1 | * | 5/2001 | Phillips et al. ............... 711/213 |
| 6,442,667 | B1 | * | 8/2002 | Shiell ................. G06F 12/0893 |
| | | | | 711/207 |
| 7,062,526 | B1 | * | 6/2006 | Hoyle ........................... 708/620 |
| 2002/0004916 | A1 | * | 1/2002 | Marchand ............. G06F 1/3203 |
| | | | | 713/322 |
| 2008/0201526 | A1 | * | 8/2008 | Yabe ............................ 711/114 |
| 2011/0225396 | A1 | * | 9/2011 | Pechanek ............. G06F 9/3802 |
| | | | | 712/206 |
| 2012/0260075 | A1 | * | 10/2012 | Henry ................ G06F 9/30174 |
| | | | | 712/225 |
| 2012/0297379 | A1 | * | 11/2012 | Anderson .......... G06F 9/45558 |
| | | | | 718/1 |

OTHER PUBLICATIONS

LaForest et al. "Multi-Ported Memories for FPGAs via XOR," Department of Electrical and Computer Engineering, University of Toronto, Feb. 2010 (10 pages) [Retrieved on Nov. 21, 2013]. Retrieved from the Internet:<URL: http://www.eecg.toronto.edu/~steffan/papers/laforest_xor_fpga12.pdf>.

* cited by examiner

CONFIGURABLE STORAGE CIRCUITS WITH EMBEDDED PROCESSING AND CONTROL CIRCUITRY

BACKGROUND

This invention relates to integrated circuits and, more particularly, to configurable storage blocks in an integrated circuit.

Considering a programmable logic device (PLD) as one example of an integrated circuit, as applications for which PLDs are used increase in complexity, it has become more common to design PLDs to include specialized blocks such as configurable storage blocks in addition to blocks of generic programmable logic.

Configurable storage blocks are often arranged in arrays of memory elements. In a typical array, data lines are used to write data into and read data from the configurable storage blocks. Address lines may be used to select which of the memory elements are being accessed. A configurable storage block is typically configurable to implement a memory of a given depth and width, whereby the maximum depth is based on the number of address lanes and the maximum width on the number of data lanes.

Many common memory operations are executed inefficiently using these configurable storage blocks. For example, read-modify-write operations where data is retrieved from memory, modified, and written back to memory may require several clock cycles to complete. The address must usually be provided for the read and the write operation even though the address for the write operation may be known (e.g., if the read and write operations target the same address).

Consequently, it would be desirable to implement a configurable storage block that executes common memory operations more efficiently.

SUMMARY

In accordance with certain aspects of the invention, circuitry with input and output ports and which includes a storage circuit, a processing circuit, and a configurable control circuit is presented. The configurable control circuit may be coupled to the input ports, the processing circuit, and the storage circuit. The configurable control circuit may receive an instruction from the input ports and decode the received instruction to identify a command. The configurable control circuit is controlled by the command to direct the storage circuit to perform a memory access operation and the processing circuit to execute a data processing operation. For example, the configurable control circuit may read data from the storage circuit, direct the processing circuit to process the read data and the storage circuit to store the processed data.

It is appreciated that the present invention can be implemented in numerous ways, such as a process, an apparatus, a system, a device, or instructions executed on a programmable processor. Several inventive embodiments are described below.

In certain embodiments, the above-mentioned circuitry may decode the instruction which may include a write command, an address, and data, and the configurable control circuit may direct the storage circuit to store the data at the address. If desired, the circuitry may include programmable delay circuits that receive the data from the configurable control circuit and delay storing the received data in the storage circuit by a given number of clock cycles.

In certain embodiments, the above-mentioned processing circuit may include an arithmetic operator circuit that receives the data and performs a given arithmetic function on the received data. The given arithmetic function may be selected based on the decoded instruction. If desired, the selected arithmetic function may add a predetermined number to the received data.

Further features of the invention, its nature and various advantages, will be more apparent from the accompanying drawings and the following detailed description of the preferred embodiments.

DETAILED DESCRIPTION

The present invention relates to integrated circuits and more specifically to configurable storage blocks in an integrated circuit.

Configurable storage blocks are often arranged in arrays of memory elements. In a typical array, data lines are used to write data into and read data from the configurable storage block. Address lines may be used to select which of the memory elements are being accessed. A configurable storage block is typically configurable to implement a memory of a given depth and width, whereby the maximum depth is based on the number of address lanes and the maximum width on the number of data lanes.

The circuit area occupied by a configurable storage block is constrained by the input and output multiplexers that allow for memory implementations with variable port width. Thus, configurable storage blocks are often port-width limited, and situations frequently arise where common memory operations are implemented inefficiently using configurable storage blocks.

Further, read-modify-write operations where data is retrieved from memory, modified, and written back to memory may require several clock cycles to complete. The memory address must usually be provided for the read and the write operation even though the address for the write operation may be known (e.g., if the read and write operations target the same address). As another example, traversing a linked list or a graph structure stored in memory, which is sometimes also referred to as pointer chasing, requires the repeated retrieval of data from the memory array whereby the data stored at the current memory location holds a pointer (i.e., memory address) of the next memory location. As a result, the data retrieved during the current memory access operation is used as the address for the next memory access operation.

It may therefore be desirable to provide a modified configurable storage block with additional circuitry (e.g., with a processing circuit and a configurable control circuit in addition to the memory array). Such a modified configurable storage block may receive instructions. These instructions may be decoded to identify commands which may control the memory array, the processing circuit, and the configurable control circuit such that the modified configurable storage block executes common memory operations more efficiently (e.g., by reducing latency and increasing throughput) while using less input and output ports and thus reducing routing congestion and improving the use of the memory bandwidth.

It will be recognized by one skilled in the art, that the present exemplary embodiments may be practiced without some or all of these specific details. In other instances, well-known operations have not been described in detail in order not to unnecessarily obscure the present embodiments.

Figure 1:
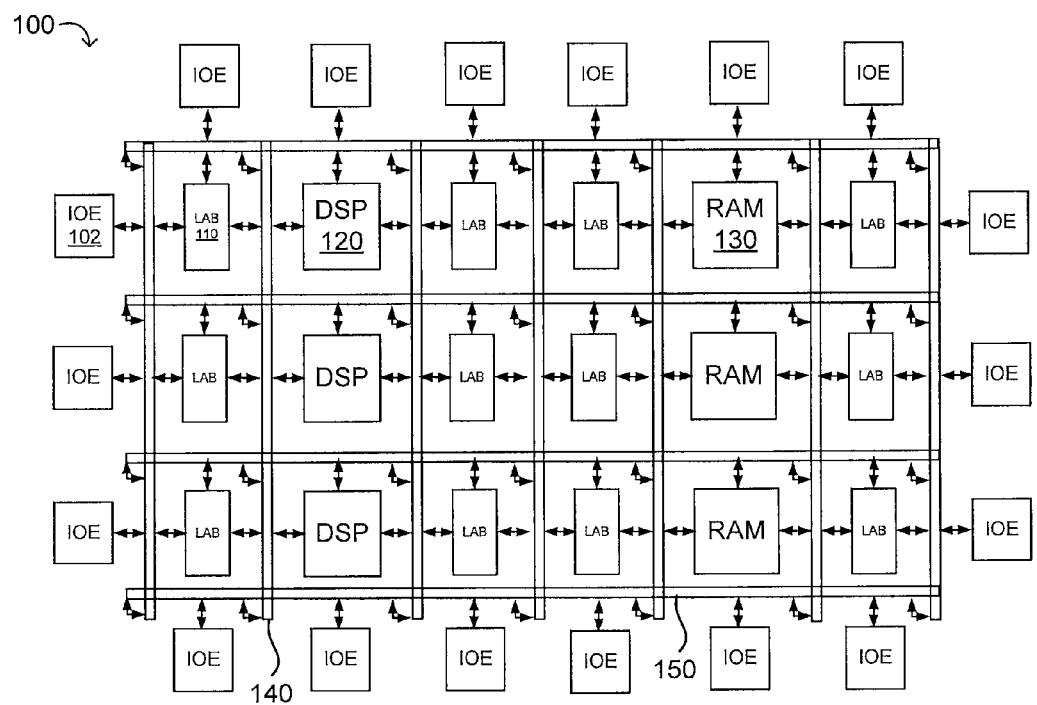
FIG. 1 is a diagram of an illustrative integrated circuit with embedded configurable storage circuit in accordance with an embodiment.

An illustrative embodiment of an integrated circuit such as a programmable logic device (PLD) 100 with a modified configurable storage block in accordance with the present invention is shown in FIG. 1. Programmable logic device 100 may have input/output circuitry 102 for driving signals off of PLD 100 and for receiving signals from other devices. Input/output circuitry 102 may include conventional input/output circuitry, serial data transceiver circuitry, differential receiver and transmitter circuitry, or other circuitry used to connect one integrated circuit to another integrated circuit.

As shown, input/output elements 102 may be located around the periphery of the chip. If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

Vertical interconnection resources 140 and horizontal interconnection resources 150 such as global and local vertical and horizontal conductive lines and buses may be used to route signals on PLD 100. Vertical and horizontal interconnection resources 140 and 150 include conductive lines and programmable connections between respective conductive lines and are therefore sometimes referred to as programmable interconnects.

Programmable logic regions may include programmable components such as digital signal processing circuitry 120, storage circuitry 130, or other combinational and sequential logic circuitry organized in logic array blocks 110. The programmable logic regions may be configured to perform a custom logic function. If desired, the programmable logic region may include digital signal processing circuitry 120 and storage circuitry 130 which both may be organized in specialized blocks that have limited configurability. The programmable logic region may include additional specialized blocks such as programmable phase-locked loop circuitry, programmable delay-locked loop circuitry, or other specialized blocks with limited configurability.

Programmable logic device 100 contains programmable memory elements. These memory elements can be loaded with configuration data (sometimes also referred to as programming data) using input/output circuitry 102. Once loaded, the memory elements each provide a corresponding static control signal that controls the operation of an associated logic component in a programmable logic region. In a typical scenario, the outputs of the loaded memory elements are applied to the gates of transistors in the programmable logic region to turn certain transistors on or off and thereby configure the logic and the routing paths in the programmable logic region. Programmable logic circuit elements that may be controlled in this way include parts of multiplexers (e.g., multiplexers used for forming routing paths in programmable interconnects), look-up tables, logic arrays, AND, OR, NAND, and NOR logic gates, pass gates, etc.

Memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements are loaded with configuration data during programming, memory elements are sometimes referred to as configuration memory, configuration RAM, or programmable memory elements.

The circuitry of programmable logic device 100 may be organized using any suitable architecture. As an example, the logic of programmable logic device 100 may be organized in a series of rows and columns of larger programmable logic regions each of which contains multiple smaller logic regions. The smaller regions may be, for example, regions of logic that are sometimes referred to as logic elements (LEs) or basic logic elements (BLEs), each containing a look-up table, one or more registers, and programmable multiplexer circuitry. The smaller regions may also be, for example, regions of logic that are sometimes referred to as adaptive logic modules (ALMs), configurable logic blocks (CLBs), slice, half-slice, etc. Each adaptive logic module may include a pair of adders, a pair of associated registers and a look-up table or other block of shared combinational logic (i.e., resources from a pair of LEs—sometimes referred to as adaptive logic elements or ALEs in this context). The larger regions may be, for example, logic array blocks (LABs) or logic clusters of regions of logic containing multiple logic elements or multiple ALMs.

During device programming, configuration data is loaded into programmable logic device 100 that configures the programmable logic regions so that their logic resources perform desired logic functions.

Figure 2:
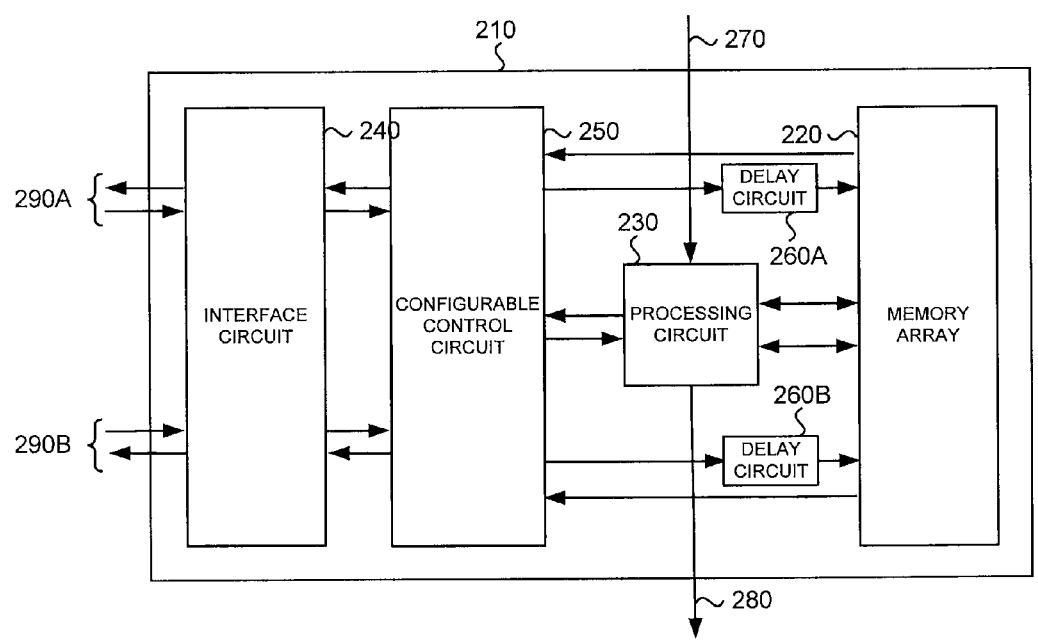
FIG. 2 is a diagram of an illustrative smart memory circuitry with a memory array, a processing circuit, an interface circuit, a configurable control circuit, and delay circuits in accordance with an embodiment.

Storage circuitry 130 may be implemented as a modified configurable storage blocks. An embodiment of such a configurable storage block is shown in FIG. 2. Configurable storage block 210 may include a memory array 220 such as a random-access memory (RAM), read-only memory (ROM), or other memory elements, a processing circuit 230 such as embedded microprocessors digital signal processors (DSP), microcontrollers, or other processing circuitry, an interface circuit 240, a configurable control circuit 250, and delay circuits 260A and 260B.

Interface circuit 240 may include registers to ensure synchronous access to the configurable storage block. If desired, the registers may be part of memory array 220 or configurable control circuit 250 may direct delay circuits 260 to synchronize memory access operations. Interface circuit 240 may include registers on the output ports which may be selectively bypassed. Interface circuit 240 may include circuitry to handle secondary signals (e.g., write enable, read enable, byte enable, clock enable, clock, etc.), and configurable control circuit 250 may control the use of secondary signals for memory access operations and processing operations.

As shown, configurable storage block 210 may have input and output ports 290A and 290B for receiving instructions and providing data and may include input 270 and output 280 to convey data between processing circuits of neighboring configurable storage blocks.

If desired, interface circuit 240 may include pipeline registers coupled to input and output ports 290A and 290B. The pipeline registers may enable the streaming of data at ingress and egress of configurable storage block 210, thereby increasing the throughput.

Configurable storage block 210 described in FIG. 2 is merely illustrative and not intended to limit the scope. If desired, configurable storage block 210 may have more or less input and output ports 290 (e.g., to implement a single-port memory or to implement a quad-port memory), more connections between neighboring configurable storage blocks (e.g., to share memory array addresses between configurable storage blocks), more delay circuits (e.g., between the memory array and the configurable control circuit on the read path), or an interface circuit included in configurable control circuit 250 as opposed to a separate interface circuit 240 as shown in FIG. 2.

Consider the example in which interface circuit 240 receives an instruction at input port 290A. The interface circuit 240 may convey the instruction to configurable control circuit 250. Configurable control circuit 250 may include a decoder circuit which may decode the instruction and identify a command portion and a data portion. The command portion may be associated with a set of instructions which may reside in a storage circuit. Configurable control circuit 250 may retrieve the set of instructions from the storage circuit and direct the processing circuit 230, the memory array 220, the delay circuits 260, and the interface circuit 240 to execute the instructions.

Figure 3:
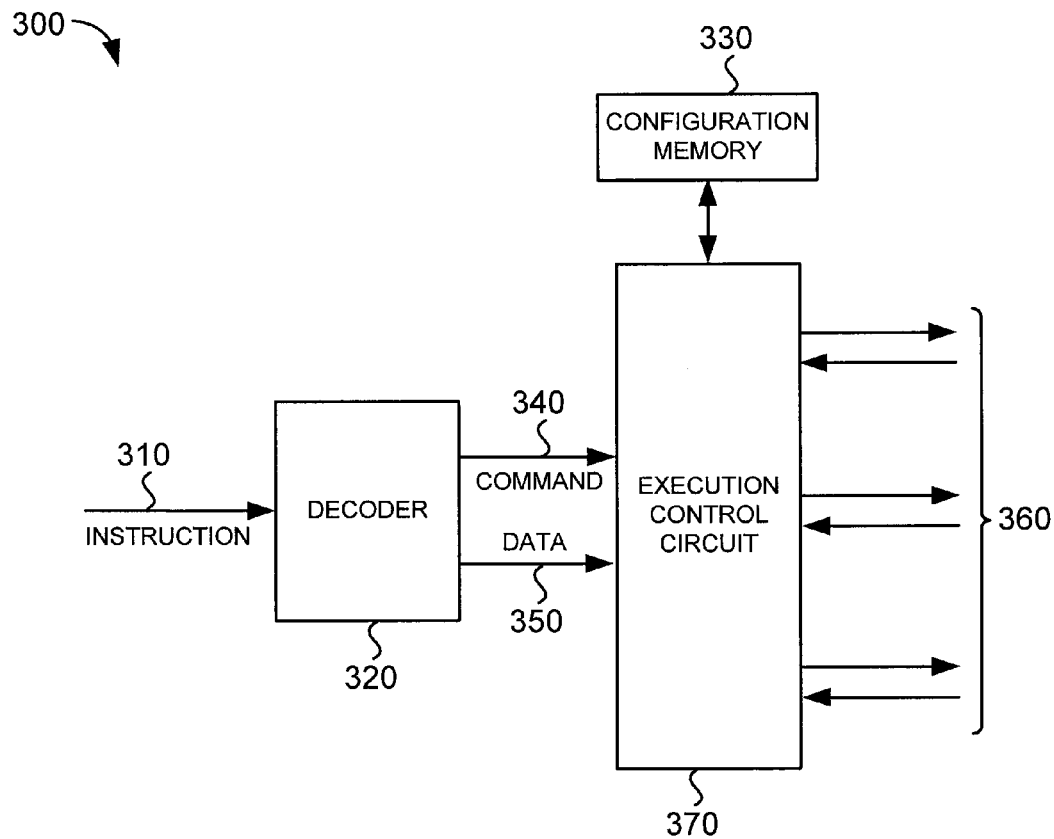
FIG. 3 is a diagram of illustrative decoder circuitry that decodes the instructions for a configurable storage circuit in accordance with an embodiment.

FIG. 3 shows an embodiment of a configurable control circuit 300 which may include a decoder 320, configuration memory 330, and execution control circuit 370. Decoder 320 may receive an instruction 310 and decode the instruction to identify command 340 and data 350. Execution control circuit 370 may receive command 340 and data 350 from the decoder 320 and retrieve a sequence of instructions which may be stored in configuration memory 330 based on the identified command. Execution control circuit may direct components of the configurable storage block (e.g., processing circuit 230 or memory array 220 of FIG. 2) to perform the retrieved sequence of instructions 360.

Figure 4A:
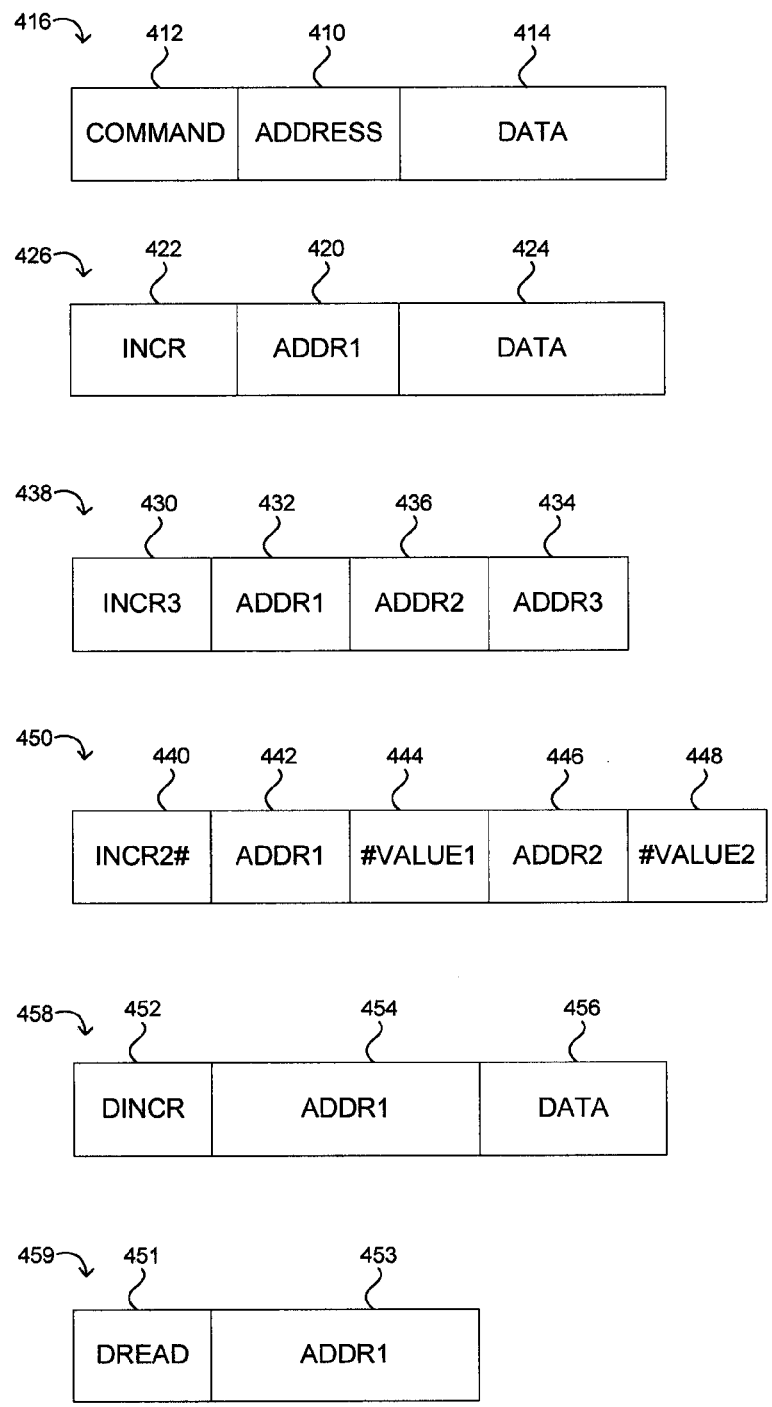
FIG. 4A is a diagram of illustrative instructions for operating a configurable storage circuit in accordance with an embodiment.
Figure 4B:
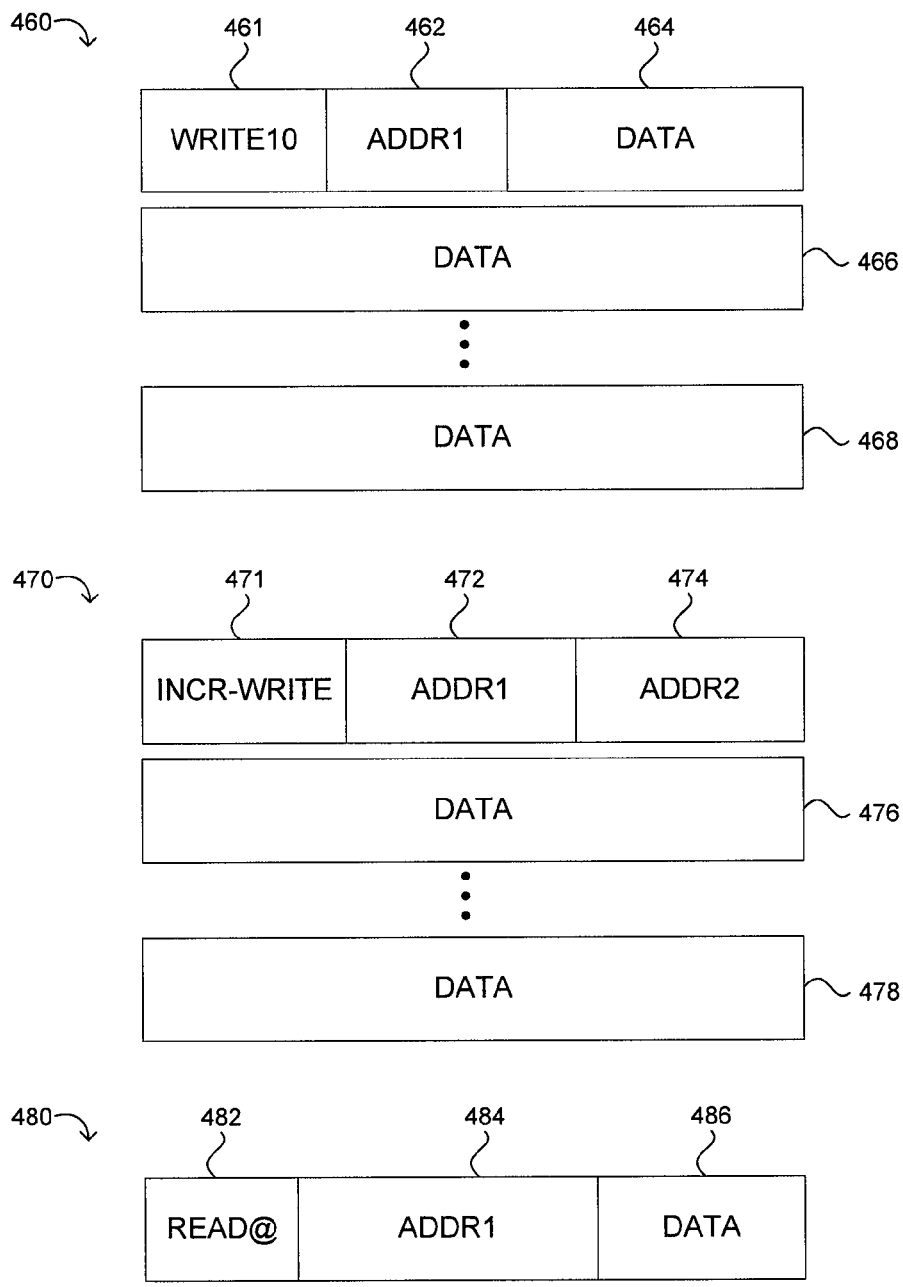
FIG. 4B is a diagram of illustrative multi-cycle instructions for operating a configurable storage circuit in accordance with an embodiment.

Examples of instructions 310 that the decoder may receive are shown in FIGS. 4A and 4B. For example, the decoder may receive instruction 416 which may include a command 412, an address 410, and data 414. Command 412 may indicate a memory access operation (e.g., a read operation for which data 414 may be omitted or a write operation including data 414), and execution control circuit 370 of FIG. 3 may direct memory array 220 of FIG. 2 to perform the memory access operation at address 410 using data 414.

In another example, instruction 426 may include a command 422, address 420, and data 424. In this example, the command may indicate an increment INCR, a decrement DECR (not shown), or any other arithmetic operation (e.g., an addition, a subtraction, a multiplication, a division, an inverse, a square root, etc.), which the configurable control circuit 250 of FIG. 2 may associate with a read-modify-write operation. As another example, command 422 may indicate a logical operation (e.g., a bit-wise AND, OR, NAND, NOR, exclusive OR, NOT, etc.) or a relational operation (e.g., equal to, greater than, smaller than, greater equal, smaller equal, etc.). If desired, command 422 may indicate any operation, such as operations over Galois fields (e.g., for computing a cyclic redundancy check (CRC) code) or the encoding and decoding of data (e.g., for computing error correcting code (ECC) such as a Hamming code), just to name a few.

As an example, consider the command INCR 422. The command INCR may direct the configurable storage block to retrieve data stored at address ADDR1 420 in memory array 220 of FIG. 2, perform the increment operation indicated by the command using the retrieved data in processing circuit 230, and write the result of the operation back to memory array 220 at address ADDR1. Data 424 may be omitted for any operation that only requires one operand (e.g., the increment, the decrement, the inverse, the square root operation, the NOT operation, etc.). Thus, executing a read-modify-write operation as previously described may decrease latency and reduce routing congestion in proximity of configurable storage block 210 of FIG. 2.

If desired, configurable storage block 210 may provide an adaptable timing model. As an example, the adaptable timing model may select among different delays based on command 422. For example, the adaptable timing model may select a first timing model when command 422 selects an operation that is associated with a first duration of time and a second timing model when command 422 selects an operation that is associated with a second duration of time which is different than the first duration of time. For example, the execution of a multiplication requires a longer duration than the execution of an increment operation. Thus, the adaptable timing model may provide a slower timing model for the configurable storage block if command 422 indicates a multiplication associated with a read-modify-write operation than if command 422 indicates an increment operation associated with a read-modify-write operation. The adaptable timing model may provide additional timing models when an instruction requires the execution of multiple operations.

Instruction 438 is an example of performing multiple operations in the same configurable storage block. Instruction 438 may include a command 430 followed by multiple addresses (e.g., addresses 432, 436, and 434). The command may indicate an operation such as an arithmetical, a logical, or relational operation that requires a single operand (e.g., an increment operation, a decrement operation, an inverse operation, a square root operation, a NOT operation, etc.). Configurable control circuit 250 may retrieve data stored at the multiple addresses in memory array 220, separately execute the indicated operation on each of the retrieved data in processing circuit 230, and store the result of the operation at the respective addresses.

As shown, the command 430 may indicate an increment operation which is performed on three different sets of data that are stored in the memory array at locations ADDR1, ADDR2, and ADDR3, respectively. The result of the increment operation may be stored at the respective locations in the memory array.

Executing multiple operations in the same configurable storage block may utilize the input and output ports 290A and 290B of FIG. 2 more efficiently. It may therefore be desirable to combine the execution of multiple operations in the same configurable storage block with the ability to provide a second operand to the operation. Instruction 450 is an example for performing an operation (e.g., an arithmetical, a relational, or a logical operation) as identified by command 440 at two different addresses 442 and 446, whereby the second operands are provided as two constants 444 and 448. In such a scenario, configurable control circuit 250 may retrieve data stored in memory array 220 at addresses 442 and 446, separately execute the indicated operation (e.g., an addition) in processing circuit 230 on each of the retrieved data using constant 444 with the data retrieved at address 442 and constant 448 with the data retrieved at address 446. The result of the respective operations may be stored in memory array 220 at addresses 442 and 446.

If desired, memory array 220 may store data that is wider than the maximum width of input and output ports of configurable storage block 210 (e.g., by storing a first portion of the data at a first address location and subsequent portions at subsequent address locations). As an example, consider the storage of 64-bit wide data in a configurable storage block that has a maximum width of 32-bits. In this scenario, every memory access operation involving 64-bit wide data (e.g., a read operation or a write operation) requires two successive 32-bit wide memory access operations (e.g., using instruction 459 with command 451 and address 453 for a read operation or two successive instances of instruction 416 for a write operation). However, any operation involving stored data may be executed at once. For this purpose, consider instruction 458 which includes a command 452, an address 454, and optional data 456. The command 452 may indicate that data needs to be retrieved from memory array 220 at two consecutive addresses (e.g., at addresses ADDR1 and 1+ADDR1). Configurable control circuit 250 may direct the processing circuit 230 to execute the selected operation using the retrieved data and optional data 456 and direct the memory array 220 to store the result of the operation at addresses ADDR1 and 1+ADDR1.

An embodiment of configurable storage block 210 of FIG. 2 may provide for multi-cycle operations where the configurable storage block receives multiple consecutive instructions which together form a multi-cycle instruction (e.g., in applications having memory write bursts). Examples of such multi-cycle instructions are shown in FIG. 4B. As an example consider multi-cycle instruction 460 that includes a first instruction with command 461, address 462, and data 464 followed by one or more instructions with data (e.g., instruction 466 to instruction 468). For example, command 461 may indicate a memory access operation (e.g., a write operation) at address 462 and subsequent addresses of the memory array. The memory access operation may or may not be dependent on a condition (e.g., an enable signal). The command may also indicate the number of subsequent instructions in the multi-cycle instruction (e.g., WRITE10 may indicate that there are 10 subsequent instructions). Alternatively, data 464 may include the number of instructions in the multi-cycle instruction. In case of a conditional memory access operation, data 464 may include the condition upon which the memory access operation depends.

Multi-cycle instructions may need one extra configurable storage block access operation while requiring less input ports for each of the access operations. Consider the example in which the memory array 220 of configurable storage block 210 of FIG. 2 is configured as a 512-bit deep and 32-bit wide memory (i.e., the address requires 9 bits), and every command is encoded using 5 bits. In this example, every instruction with command, address, and data requires a total of 46 bits. A set of 10 memory access operations requires 10 instructions and an input port width of 46 bits. Alternatively, multi-cycle instruction 460 may send a first instruction including a 5-bit command, a 9-bit address, and up to 18-bit data followed by 10 32-bit data. Thus, the multi-cycle instruction has 11 instructions and requires an input port width of 32 bits.

If desired, a multi-cycle instruction for a multi-cycle operation (e.g., multi-cycle instruction 470) may have a first instruction that includes command 471 and addresses 472 and 474. Command 471 may combine an operation (e.g., an arithmetical, a relational, or a logical operation) with a memory access operation. For example, command 471 may retrieve data from memory array 220 of FIG. 2 at consecutive addresses starting with address 472, execute the operation in processing circuit 230 using the retrieved data and data 476 to 478 received during subsequent cycles, and store the result in memory array 220 at consecutive addresses starting with address 474.

As shown, command 471 may include an INCR WRITE operation which is an increment operation that is combined with a write operation. The INCR WRITE operation may retrieve data from memory array 220 of FIG. 2 at consecutive addresses starting with address 472, increment the retrieved data, and store the result in memory array 220 at consecutive addresses starting with address 474.

If desired, configurable storage circuit 210 of FIG. 2 may perform memory access operations where the contents of the memory array stored at a given address determines the next address of the memory array 220 that is accessed (e.g., to implement tree traversals or linked list processing). An embodiment of an instruction that may direct configurable storage block 210 of FIG. 2 to perform such an operation which is sometimes also referred to as indirect addressing is shown as instruction 480 in FIG. 4B.

Instruction 480 may have a command 482, an address 484, and optional data 486. Data 486 may be omitted if command 482 indicates a read operation or an operation that only requires one operand. For example, configurable control circuit 250 of FIG. 2 may retrieve data from memory array 220 at address ADDR1, perform an operation on the retrieved data and data 486 using processing circuit 230, and store the result of the operation at ADDR1. Alternatively, the operation may evaluate a condition based on the retrieved data and optionally on data 486 (e.g., to decide whether to stop indirect addressing). As an example, configurable control circuit 250 of FIG. 2 may retrieve data from memory array 220 at address ADDR1, compare the values of the retrieved data and data 486, and perform the operation indicated by command 482 only if the value of the retrieved data is bigger than data 486. Configurable control circuit 250 may then, depending on the evaluated condition, retrieve data from memory array 220 at address 1+ADDR1 and retrieve data from memory array 220 as indicated by the data retrieved from 1+ADDR1.

An embodiment may implement a buffer manager. The buffer manager may track the number of free buffers by decrementing a free-buffer count by some amount N when N buffers are consumed (e.g., when receiving a data packet of size N) or incrementing the free-buffer count by some amount M when M buffers are freed (e.g., when sending a data packet of size M). Configurable storage block 210 of FIG. 2 may implement such a buffer manager with a read-modify-write operation (e.g., upon receiving an instruction such as instruction 426 of FIG. 4A) where the current free-buffer count is retrieved from memory array 220, modified by processing circuit 230 (e.g., by adding or subtracting a number), and written back to memory array 220.

Figure 5:
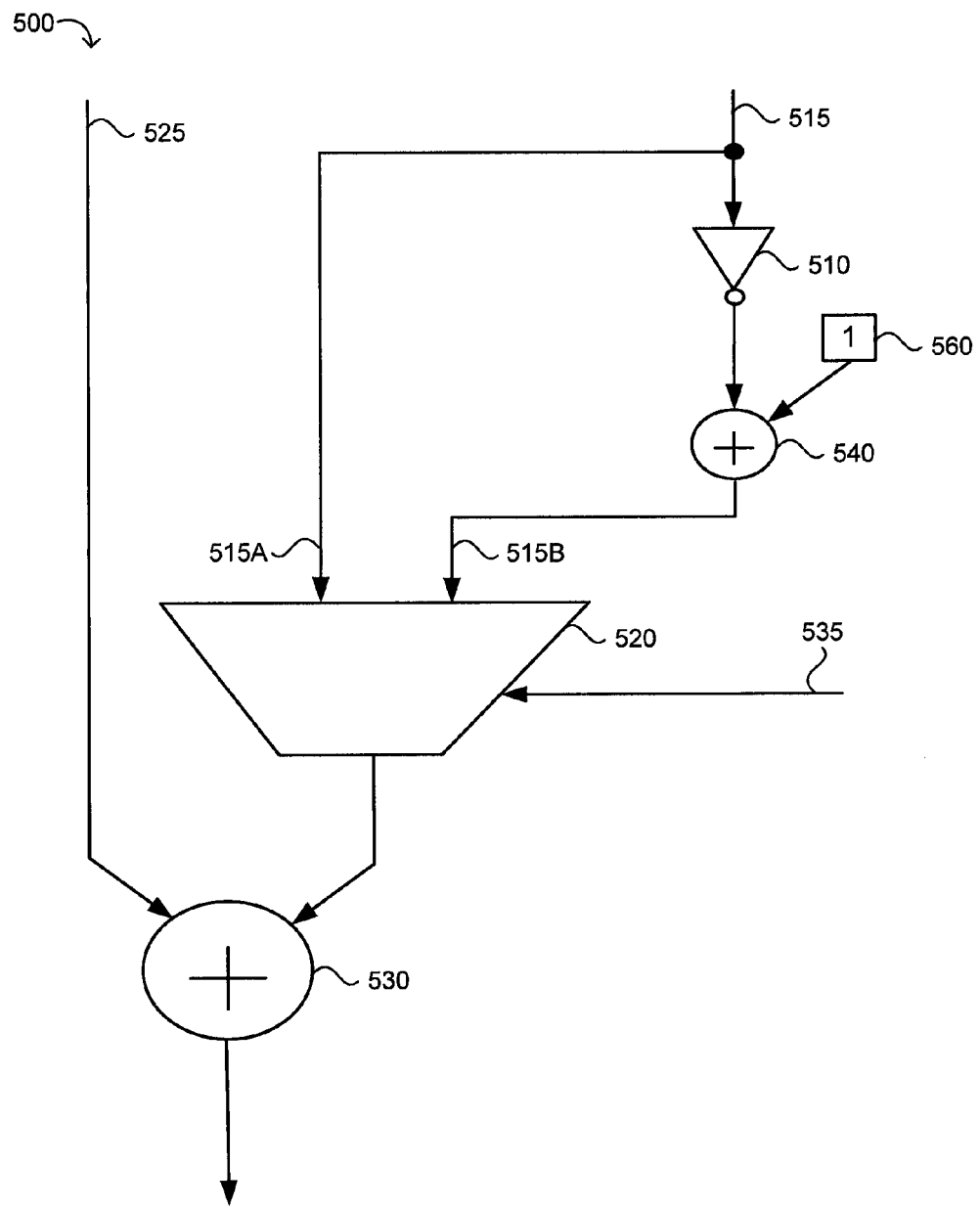
FIG. 5 is a diagram of illustrative processing circuitry in a configurable storage circuit in accordance with an embodiment.

FIG. 5 shows an embodiment of processing circuit 230 of FIG. 2. As shown, processing circuit 500 may perform an addition or a subtraction. The processing circuit may retrieve data 525 (e.g., the current buffer count) from the memory array at the address indicated by the instruction (e.g., address 420 of instruction 426 in FIG. 4A). The processing circuit may also receive data 515 (e.g., the change in free-buffer count) embedded in the instruction (e.g., data 424 of instruction 426). The processing circuit may add or subtract the received data 515 from the retrieved data 525 as indicated by a command embedded in the instruction (e.g., command 422 of instruction 426). Inverter 510 may invert all bits of the received data 515. Adding a constant "1" 560 to the inverted received data with adder 540 generates the 1's complement 515B of received data 515. Multiplexer 520 may select between the received data 515A and the 1's complement of the received data 515B based on selector signal 535. The selected data may be added to the retrieved data 525 in adder circuit 530.

As an example, consider that the free-buffer count increases when data is read from the buffer. In this example, selector signal 535 may select the received data (i.e., data 515A) using multiplexer 520 and add the received data to the retrieved data 525 using adder circuit 530. Alternatively, the free-buffer count may decrease when data is written to the buffer. In this case, selector signal 535 may select the 1's complement of the received data (i.e., data 515B) using multiplexer 520 and add the selected data to the retrieved data 525 using adder circuit 530, thereby subtracting the received signal 515 from the retrieved signal 525. The updated free-buffer count may be written back to memory (e.g., to memory array 220 of FIG. 2).

Figure 6:
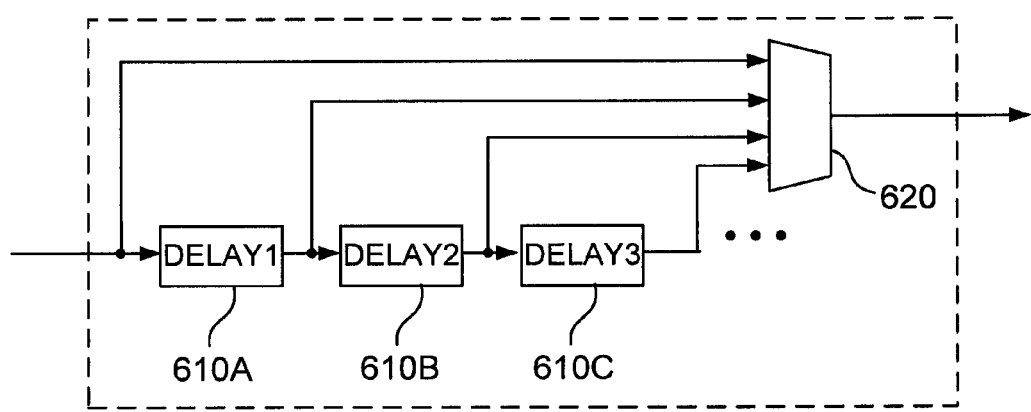
FIG. 6 is a diagram of illustrative configurable delay circuitry in a configurable storage circuit in accordance with an embodiment.

If desired, memory access operations (e.g., write or read operations) may be delayed (e.g., using delay circuit 260A or 260B of FIG. 2). A delay circuit may have variable delay to allow for multiple delay settings as defined by a user. An embodiment of a delay circuit with configurable delay is shown in FIG. 6.

Multiplexer 620 in the delay circuit may choose from a wide variety of delays by selecting any of the cascaded delay blocks 610A, 610B, and 610C to produce a delayed signal. Delay blocks 610A, 610B, and 610C may be arranged in series as shown in FIG. 6 and the output of each delay block may feed into multiplexer 620. Alternatively, delay blocks 610A, 610B, and 610C may be arranged in parallel, or they may be arranged in a mix of parallel and serial delay blocks. There may be more or less than three delay blocks. The use of more delay blocks may increase the granularity of delays while the use of less delay blocks may reduce the circuit area.

Figure 7:
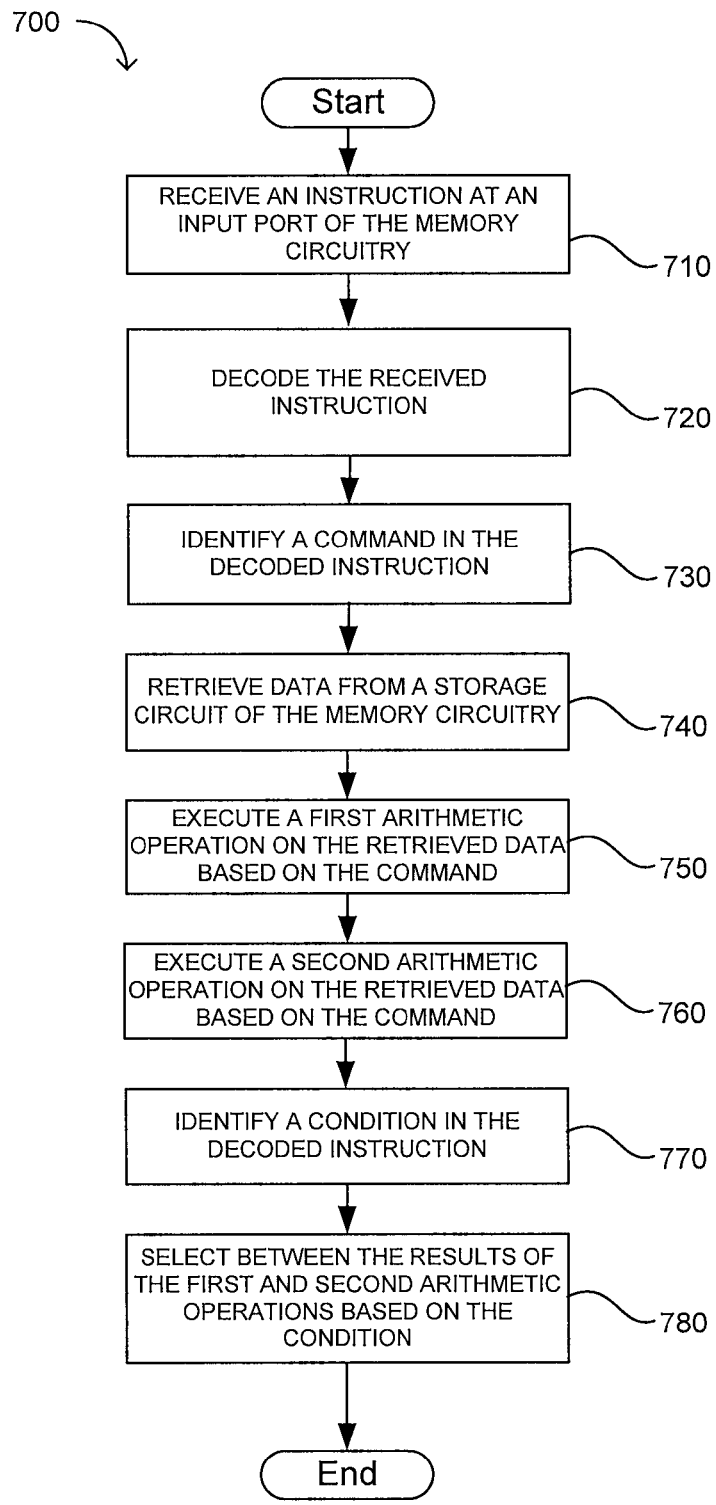
FIG. 7 is a flow chart showing illustrative steps for operating a configurable storage circuit in accordance with an embodiment.

FIG. 7 is a flow chart showing illustrative steps for operating a configurable storage circuit such as configurable storage circuit 210 in accordance with an embodiment. During step 710, the configurable storage circuit may receive an instruction such as one of the instructions illustrated in FIGS. 4A and 4B at an input.

During step 720, the configurable storage circuit may decode the received instruction. For example, the configurable storage circuit may include a configurable control circuit 250 which may have a decoder circuit 300. The configurable control circuit may then identify a command in the decoded instruction during step 730. Based on the command, the configurable storage circuit may retrieve data from a storage circuit (e.g., memory array 220 of FIG. 2), during step 740. During step 750, the configurable storage circuit may execute an arithmetic operation (e.g., using processing circuit 230 of FIG. 2 and a carry-in signal received at input 270 and producing a carry-out signal that may be routed to output 280) on the retrieved data as indicated by the command. For example, the configurable storage circuit may add a number to or subtract a number from the retrieved data. During step 760, the configurable storage circuit may execute another arithmetic operation (e.g., using processing circuit 230 of FIG. 2 and a carry-in signal received at input 270 and producing a carry-out signal that may be routed to output 280) on the retrieved data as indicated by the command. During step 770, the configurable storage block may identify a condition in the decoded instruction (e.g., using configurable control circuit 250 of FIG. 2). During step 780, the configurable storage block may select between the results of the first and the results of the second arithmetic operations based on the condition identified in the decoded instruction.

As an example, consider that the configurable storage block tracks ingress and egress data flow. In this example, the configurable storage block may receive an instruction which includes a command ADD_SUB_C, condition COND1, address ADDR1, and data DATA1. The data stored at ADDR1 and data DATA1 may be integer numbers. Command ADD2_SUB_C may indicate a conditional read-modify-write operation in which data DATA1 is added to the data stored at address ADDR1 and subtracted from the data stored at address ADDR1, respectively. Condition COND1 may be a mode selection setting, based on prior data, or based on the result of the arithmetic operations. In this example, condition COND1 may determine the command to be performed based on the direction of data flow (e.g., the configurable storage block may store the result of the addition at address ADDR1 for an ingress data flow and the result of the subtraction for an egress data flow).

During step 720, the configurable storage block may decode the instruction and, during step 730, identify the command component as command ADD_SUB_C which is described above. During step 740, the configurable storage block may retrieve the data stored at address ADDR1, and add the retrieved data to DATA1 during step 750. During step 760, the configurable storage block may subtract DATA1 from the retrieved data.

During step 770, the configurable storage block may identify the condition COND1 which indicates whether the data flow associated with the instruction is an ingress or egress data flow. During step 780, the configurable storage block may select the result of the addition if the condition COND1 indicates an ingress data flow. The configurable storage block may select the result of the subtraction if the condition COND1 indicates an egress data flow.

A configurable storage block that performs the steps 710 to 780 internally may reduce the execution time of an operation associated with the command ADD_SUB_C by reducing the read and write operations by one cycle. Further, the configurable storage block may parallelize some of the steps described in FIG. 7. For example, steps 730 and 770 or steps 750 and 760 may be executed in parallel which may further reduce the execution time of the operation.

Figure 8:
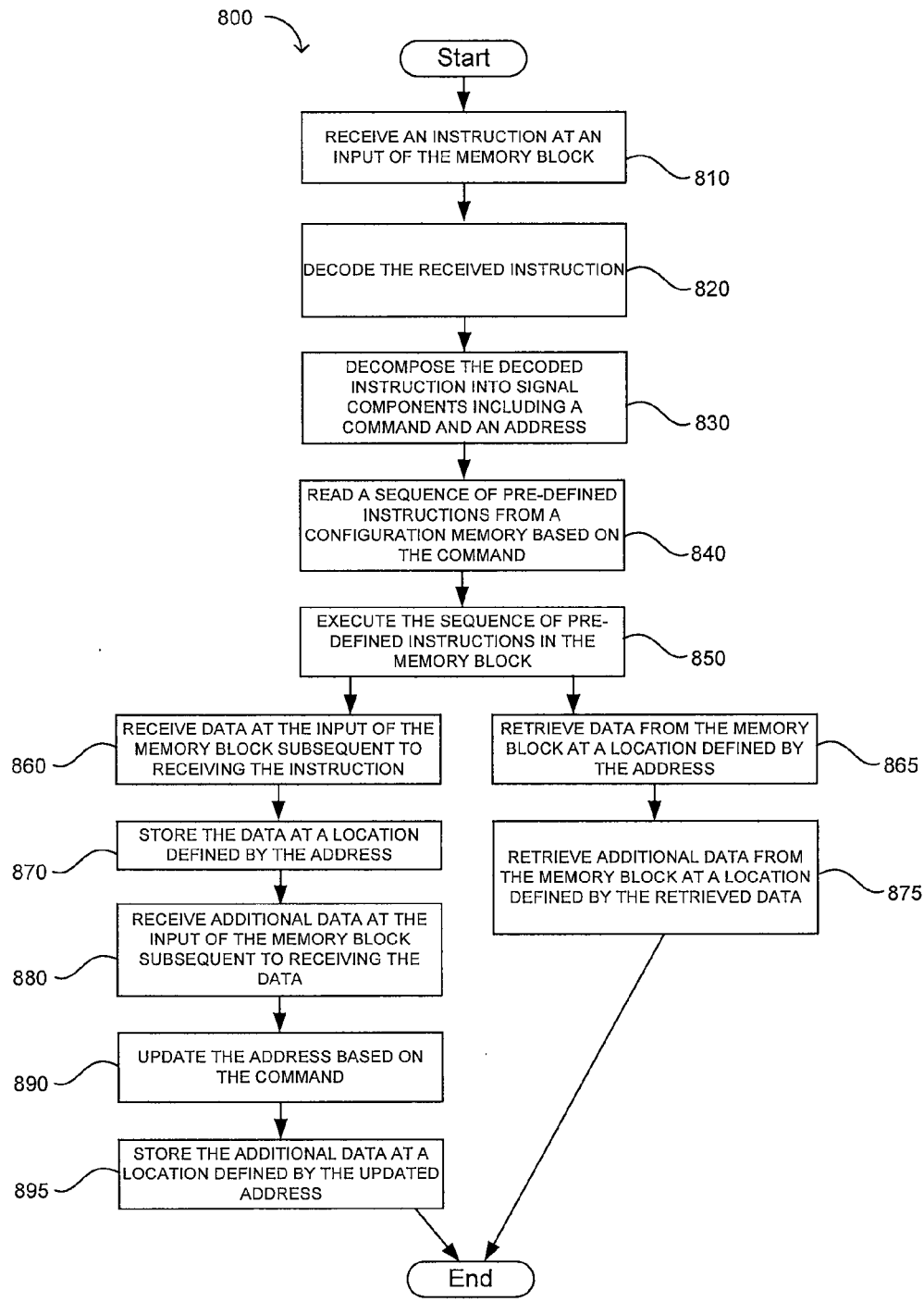
FIG. 8 is a flow chart showing illustrative steps for executing sets of instructions in a configurable storage circuit in accordance with an embodiment.

FIG. 8 is flow chart 300 showing illustrative steps for executing sets of instructions in a configurable storage circuit such as configurable storage circuit 210 of FIG. 2. During step 810, the configurable storage circuit may receive an instruction at an input. During step 920, the configurable storage circuit may decode the received instruction. For example, the configurable storage circuit may include a configurable control circuit 25S which may have a decoder circuit 300.

The configurable control circuit may then decompose the decoded instruction into signal components including a command and an address during step 830. During step 840, the configurable storage circuit may read a sequence of pre-defined instructions from a configuration memory (e.g., configuration memory 330 of FIG. 3) based on the command. During step 850, the configurable storage circuit may execute the sequence of instructions in the memory block. The sequence of pre-defined instructions may include steps 860 to 895.

For example the sequence of pre-defined instructions may include memory access operations such as retrieving and storing of data (e.g., using memory array 220 of FIG. 2). The configurable storage circuit may execute steps 865 and 875 in the event that the pre-defined instructions include an instruction to retrieve data from the memory block. In the event that the pre-defined instructions include an instruction to store data in the memory block, the configurable storage circuit may execute steps 860, 870, 880, 890, and 895.

During step 865, the configurable storage circuit may retrieve data from the memory array at a location defined by the address that was embedded in the instruction. During step 875, the configurable storage circuit may retrieve additional data from the memory array at a location defined by the retrieved data.

During step 860, the configurable storage circuit may receive a first set of data at an input subsequent to receiving the instruction. During step 870, the configurable storage circuit may store the received set of data at a location defined by the address (e.g., in memory array 220). During step 880, the configurable storage circuit may receive a second set of data at an input subsequent to receiving the first set of data. During step 890, the configurable storage circuit may update the address based on the command. For example, the configurable storage circuit may increment the address. During step 895, the configurable storage circuit may store the second set of data at a location defined by the updated address (e.g., in memory array 220).

The memory array of the configurable storage block described herein may be implemented using any storage technology (e.g., static random access memory (SRAM), dynamic random access memory (DRAM), flash memory, etc.). The functions implemented by the configurable storage block may apply to any memory array capacity, latency, and bandwidth, memory data-path implementation (e.g., common input/output or split input/output), number and type of configurable storage block interface ports, command/address/read-write control protocol, interface signaling method (e.g., parallel or serial), and the physical integration topology of the configurable storage block (e.g., single-die, 2.5-dimensional multiple-die, 3-dimensional stacked die coupled by through-silicon-vias (3D TSV)).

The method and apparatus described herein may be incorporated into any suitable electronic device or system of electronic devices. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The integrated circuit described herein may be part of a data processing system that includes one or more of the following components; a processor; memory; I/O circuitry; and peripheral devices. The integrated circuit can be used in a wide variety of applications, such as computer networking, data networking, instrumentation, video processing, digital signal processing, or any suitable other application where the advantage of using configurable storage circuitry is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. An integrated circuit comprising:
   a plurality of configurable storage blocks, each of which includes:
      a storage circuit;
      a processing circuit;
      an input port that receives an instruction;
      a configurable control circuit coupled to the input port, the processing circuit, and the storage circuit, the configurable control circuit receiving the instruction from the input port and decoding the received instruction to identify a control command, the control command controlling the configurable control circuit, the configurable control circuit directing the storage circuit to perform a memory access operation specified by the received instruction, the configurable control circuit further directing the processing circuit to execute a data processing operation specified by the received instruction; and
      an additional input port that receives data from another configurable storage block in the plurality of configurable storage blocks.

2. The integrated circuit of claim 1, wherein the input port receives an additional instruction, wherein the configurable control circuit receives the additional instruction from the input port, decodes the received additional instruction to identify an additional control command, the additional control command reconfiguring the configurable control circuit, the configurable control circuit directing the storage circuit to perform a memory access operation specified by the received additional instruction, the configurable control circuit further directing the processing circuit to execute a data processing operation specified by the received additional instruction.

3. The integrated circuit of claim 1, wherein the configurable control circuit reads data from the storage circuit, directs the processing circuit to process the read data, and directs the storage circuit to store the processed data.

4. The integrated circuit of claim 1, wherein the decoded instruction comprises a write command, an address, and a data signal, and wherein the configurable control circuit directs the storage circuit to store the data signal at the address.

5. The integrated circuit of claim 4 further comprising:
a programmable delay circuit that receives the data signal from the configurable control circuit and delays storing the received data signal in the storage circuit by a given number of clock cycles.

6. The integrated circuit of claim 4, wherein the processing circuit comprises:
an arithmetic operator circuit that receives the data signal and performs a given arithmetic function on the received data signal, wherein the given arithmetic function is selected based on the decoded instruction.

7. The integrated circuit of claim 6, wherein the configurable storage block further has an output port, wherein the arithmetic operator circuit receives the data signal from the configurable control circuit and a carry-in signal from the additional input port and computes a sum signal and a carry-out signal based on the received data signal and the carry-in signal, and wherein the configurable control circuit directs the processing circuit to route the carry-out signal to the output port and directs the storage circuit to store the sum signal.

8. The integrated circuit of claim 6, wherein the selected arithmetic function adds a predetermined number to the received data signal.

9. The integrated circuit of claim 6 further comprising:
a configuration memory circuit that stores configuration data, wherein the configuration data selects the given arithmetic function.

10. The integrated circuit of claim 1, wherein the configurable control circuit further comprises:
a decoder circuit that receives the instruction and decodes the received instruction to identify the control command.

11. The integrated circuit of claim 10, wherein the control command comprises a read command, a read address, and a read enable.

12. The integrated circuit of claim 10, wherein the control command comprises a write command, a write address, and a write enable.

13. A method for operating embedded memory circuitry having configurable control circuitry on an integrated circuit, comprising:
receiving a signal at an input port of the embedded memory circuitry;
with the configurable control circuitry, decoding the received signal;
with the configurable control circuitry, identifying a command in the decoded signal; and
accessing a storage circuit based on the identified command, wherein the identified command is a read-modified-write command and wherein accessing the storage circuit based on the identified read-modified-write command comprises:
retrieving data from a given address on the storage circuit of the embedded memory circuitry;
with a processing unit in the embedded memory circuitry, generating write data based on the retrieved data and the identified command; and
storing the write data at the given address on the storage circuit of the embedded memory circuitry.

14. The method of claim 13, wherein generating the write data further comprises:
executing an operation on the retrieved data to determine an operation result.

15. The method of claim 14, wherein executing the operation comprises executing the operation over a Galois field.

16. The method of claim 14, wherein executing the operation is dependent upon a condition.

17. The method of claim 14, wherein generating the write data further comprises:
executing an additional operation on the retrieved data to compute an additional operation result.

18. The method of claim 17, wherein generating the write data further comprises:
identifying a condition in the decoded signal; and
selecting between the operation result and the additional operation result based on the condition.

19. A method for operating a memory block embedded in an integrated circuit, comprising:
receiving an instruction at an input of the memory block;
decoding the received instruction;
decomposing the decoded instruction into a plurality of signal components including a command signal component and an address signal component;
in response to decomposing the decoded instruction, retrieving a sequence of predefined operations from configuration memory based on the command signal component; and
executing the sequence of pre-defined operations using the memory block.

20. The method of claim 19 further comprising:
receiving data at the input of the memory block subsequent to receiving the instruction; and
storing the data in the memory block at a location defined by the address signal component.

21. The method of claim 20 further comprising:
receiving additional data at the input of the memory block subsequent to receiving the data;
updating the address signal component based on the command signal component; and
storing the additional data in the memory block at a location defined by the updated address signal component.

22. The method of claim 19, wherein executing the sequence of pre-defined operations further comprises:
retrieving data from the memory block at a location defined by the address signal component.

23. The method of claim 22, wherein the retrieved data comprises address data, and wherein executing the sequence of pre-defined operations further comprises:
reading additional data from the memory block at a location defined by the address data.

* * * * *